I. M. Watson,
Cage Trap,

No. 37,883. Patented Mar. 10, 1863.

Witnesses:
Geo. M. Denison
D. Osborn

Inventor:
I. M. Watson

UNITED STATES PATENT OFFICE.

ISAAC M. WATSON, OF GRAND RAPIDS, MICHIGAN.

IMPROVEMENT IN RAT-TRAPS.

Specification forming part of Letters Patent No. 37,883, dated March 10, 1863.

*To all whom it may concern:*

Be it known that I, I. M. WATSON, of the city of Grand Rapids, and State of Michigan, have invented certain new and useful Improvements in Rat-Traps; and I hereby declare that the following is a true and exact description of the same, reference being had to the accompanying drawings, and to the letters of reference marked thereon.

The nature of my improvement consists in constructing a trap in such a manner as to baffle the well-known sagacity of the rat, and to imprison him when he is without suspicion or apprehension of danger at the moment he treads upon the fatal trap-door; and also to allure others, who, seeing him safely housed in the compartment beneath, are rendered bold and fearless in their assaults upon the bait suspended above. Thus, by successful strategy, one after another is beguiled until their prison-house is fully tenanted.

Figure 1:
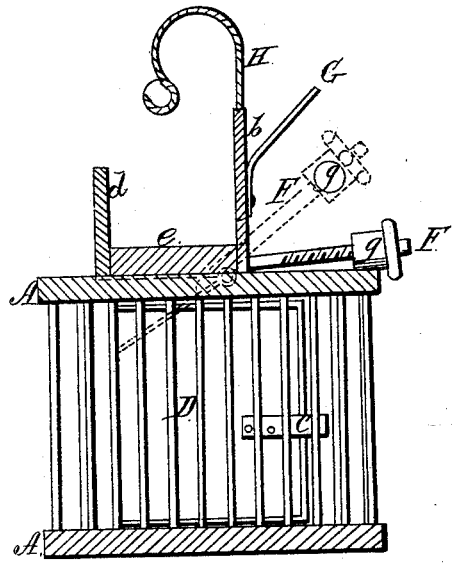
Figure 2:
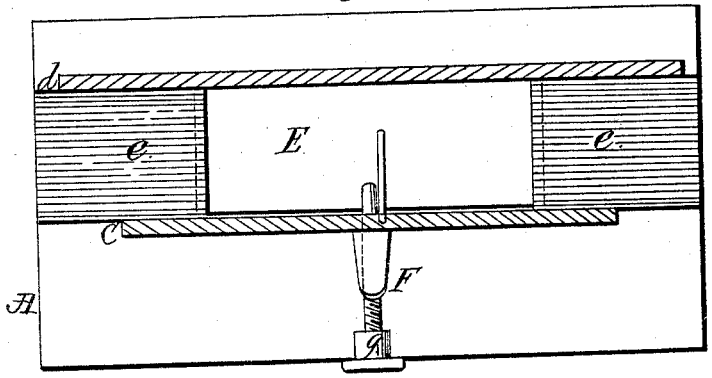

The annexed drawings, Figure 1 exhibits an end elevation, and Fig. 2 a plan view, of my trap.

A A in Fig. 1 represent the top and bottom of the trap, made of suitable thickness of wood, and are united at the corners by pillars of wood five-eighths of an inch square adapted in length as well as in thickness to the species of vermin for which the trap may be designed, as I do not limit its use to rats and mice, but it may be made of sufficient size to entrap weasels, foxes, and other predaceous animals. The top and bottom are connected by a wire grating, which is inserted about a quarter of an inch from their outer edge, and extends all around, with the exception of a space left open at one end sufficiently wide to admit of the egress of the captives within. This space is filled by the door marked D, which is hinged on one side to a wire of the grating and fastened on the opposite side by the clasp c.

b d represent the two guides, varying in height to suit the object of the trap, in every case b, to which the hook bearing the bait is attached, being made higher than d. These guides are formed of plank of suitable thickness, set up on edge, and extend lengthwise of the trap sufficiently far apart to admit of a rat's passing between them. The inner sides of the guides fit close to the platforms e e, and the platforms extend an eighth of an inch over the opening in the top of the trap, so as to form a rest to the trap-door when in position. The guide d extends over in the same manner and for the same purpose. Between these two platforms the trap-door E is suspended on pivots, which are inserted at the ends on the side next to b. Midway of the two pivots the lever F is fastened to the trap-door E at right angles with it, and passing through an opening in b large enough to admit of its free play. To the end of the lever, which extends a little beyond the outer edge of the trap, the nut g is secured, of sufficient weight to draw back the trap-door after the weight of the rat has thrown it from a horizontal position.

G is a thin metal spring fastened on the outside of b, and extending at an angle immediately above the lever F, and intended to react on the lever when suddenly thrown against it, and thus assist in bringing the trap-door back to its proper place.

H is the hook, one end being inserted in the edge of guide b and at its center, and the other or hooked end intended for holding the bait. The guide b extends to within an inch and three-quarters from each end of the trap, and d to within half an inch of the same.

Having thus fully described my invention, what I claim, and desire to secure by Letters Patent, is—

The reacting spring G, in combination with the guides b and d, operated in the manner and for the purpose herein fully set forth and described.

I. M. WATSON.

In presence of—
E. G. D. HOLDEN,
SILAS DURHAM.